United States Patent
Choi et al.

(10) Patent No.: US 12,479,229 B2
(45) Date of Patent: Nov. 25, 2025

(54) CARD WITH 3D PATTERN AND MANUFACTURING METHOD THEREOF

(71) Applicant: KONA M CO., LTD., Chungcheongbuk-do (KR)

(72) Inventors: Joung Hyun Choi, Chungcheongbuk-do (KR); Ki Sung Nam, Chungcheongbuk-do (KR); Young Hoon Jeong, Seosan-si (KR); Jae Min Yang, Chungcheongbuk-do (KR)

(73) Assignee: KONA M CO., LTD., Chungcheongbuk-do (KR)

( * ) Notice: Subject to any disclaimer, the term of this patent is extended or adjusted under 35 U.S.C. 154(b) by 0 days.

(21) Appl. No.: 18/259,759

(22) PCT Filed: Nov. 25, 2022

(86) PCT No.: PCT/KR2022/018837
§ 371 (c)(1),
(2) Date: Jun. 28, 2023

(87) PCT Pub. No.: WO2024/085303
PCT Pub. Date: Apr. 25, 2024

(65) Prior Publication Data
US 2024/0391266 A1    Nov. 28, 2024

(30) Foreign Application Priority Data
Oct. 20, 2022   (KR) .................. 10-2022-0135506

(51) Int. Cl.
*B41M 7/00* (2006.01)
*B41M 3/00* (2006.01)
(Continued)

(52) U.S. Cl.
CPC .......... *B41M 7/0045* (2013.01); *B41M 3/008* (2013.01); *B41M 5/0058* (2013.01); *G06K 19/07722* (2013.01)

(58) Field of Classification Search
None
See application file for complete search history.

(56) References Cited

U.S. PATENT DOCUMENTS

2020/0104550 A1* 4/2020 Russell-Clarke ............................ G06K 19/07743
2022/0092377 A1* 3/2022 Nam .................. B32B 38/10

FOREIGN PATENT DOCUMENTS

JP    2004-17614 A      1/2004
JP    2004017614 A  *   1/2004
(Continued)

OTHER PUBLICATIONS

Office Action for KR 10-2022-0135506 by Korean Intellectual Property Office dated Jul. 31, 2024.
(Continued)

Primary Examiner — Jose I Hernandez-Kenney
(74) Attorney, Agent, or Firm — BROADVIEW IP LAW, PC

(57) ABSTRACT

According to an embodiment of the present disclosure, a method of manufacturing a card by using a card manufacturing device includes the steps of: forming an adhesive layer on a body plate made of a metal material having a preset first surface roughness; performing a vacuum deposition process using a first metal base on the adhesive layer; and print-processing a 3D pattern layer by using UV on a surface of the adhesive layer on which the vacuum deposition process was performed.

7 Claims, 8 Drawing Sheets

(51) Int. Cl.
*B41M 5/00* (2006.01)
*G06K 19/077* (2006.01)

(56) References Cited

FOREIGN PATENT DOCUMENTS

| | | | |
|---|---|---|---|
| JP | 2017-37272 A | | 2/2017 |
| JP | 2019-220139 A | | 12/2019 |
| JP | 2020-53035 A | | 4/2020 |
| KR | 10-2016-0066300 A | | 6/2016 |
| KR | 2016066300 A | * | 6/2016 |
| KR | 10-1902207 B1 | | 11/2018 |
| KR | 10-2020-0035856 A | | 4/2020 |
| KR | 10-2022-0131452 A | | 9/2022 |
| KR | 2022131452 A | * | 9/2022 |
| WO | WO-2020197078 A1 | * | 10/2020 ............... B23C 3/13 |

OTHER PUBLICATIONS

International Search Report for PCT/KR2022/018837 by Korean Intellectual Property Office dated Jul. 12, 2023.

\* cited by examiner

FIG. 4

| tensile force & surface roughness test (physical processing parameter 1/chemical processing parameter 1) | | |
|---|---|---|
| metal material | roughness_Ra [μm] | tensile force |
| glossy #1 | 0.028 | 8.1 |
| glossy #2 | 0.011 | 6.5 |
| glossy #3 | 0.009 | 6.0 |
| semi-matte #1 | 0.161 | 22.3 |
| semi-matte #2 | 0.143 | 21.0 |
| semi-matte #3 | 0.129 | 19.8 |
| semi-matte #4 | 0.127 | 20.1 |
| semi-matte #5 | 0.153 | 23.2 |

| tensile force & surface roughness test (physical processing parameter 1/chemical processing parameter 2) | | |
|---|---|---|
| metal material | roughness_Ra [μm] | tensile force |
| glossy #1 | 0.028 | 9.1 |
| glossy #2 | 0.011 | 8.5 |
| glossy #3 | 0.009 | 8.0 |
| semi-matte #1 | 0.161 | 20.3 |
| semi-matte #2 | 0.143 | 23.0 |
| semi-matte #3 | 0.129 | 19.8 |
| semi-matte #4 | 0.127 | 22.1 |
| semi-matte #5 | 0.153 | 21.2 |

FIG. 5
| density (silk screen mesh density) | frequency (number of times) | drying time [sec] | appearance defects | etc. |
|---|---|---|---|---|
| 150 | 1 | 1800 | Fail(tilting phenomenon) | 70 |
| 200 | 1 | 1800 | NG(surface NG) | 70 |
| 250 | 1 | 1800 | Fail(weak adhesion) | 70 |
| 250 | 2 | 1800 | NG(thickness defects) | 70 |
| 300 | 1 | 1800 | Fail(weak adhesion) | 70 |
| 300 | 2 | 300 | PASS | 90 |
FIG. 6
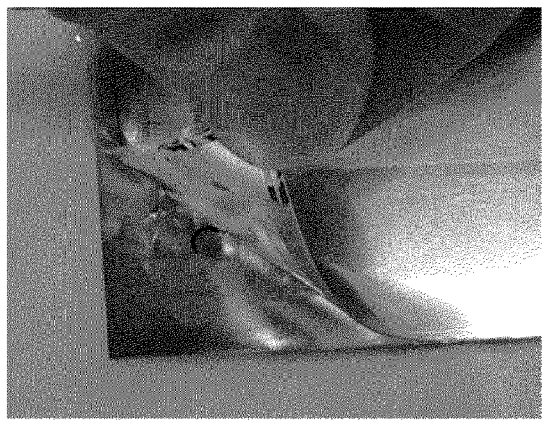
(A)
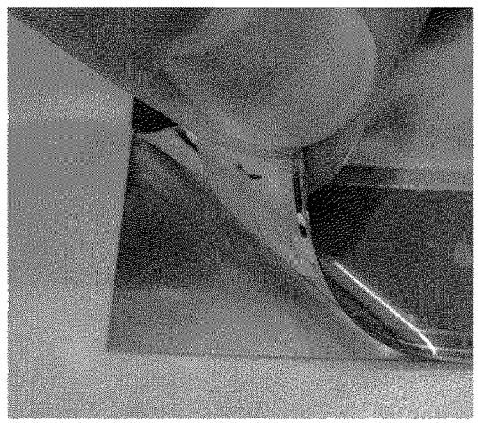
(B)

FIG. 7
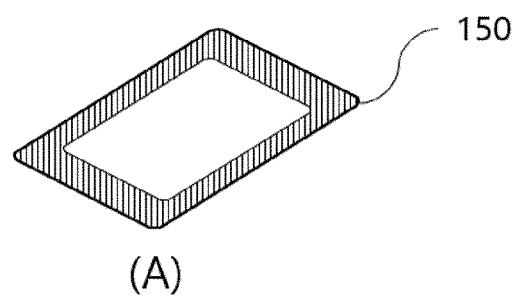
(A)
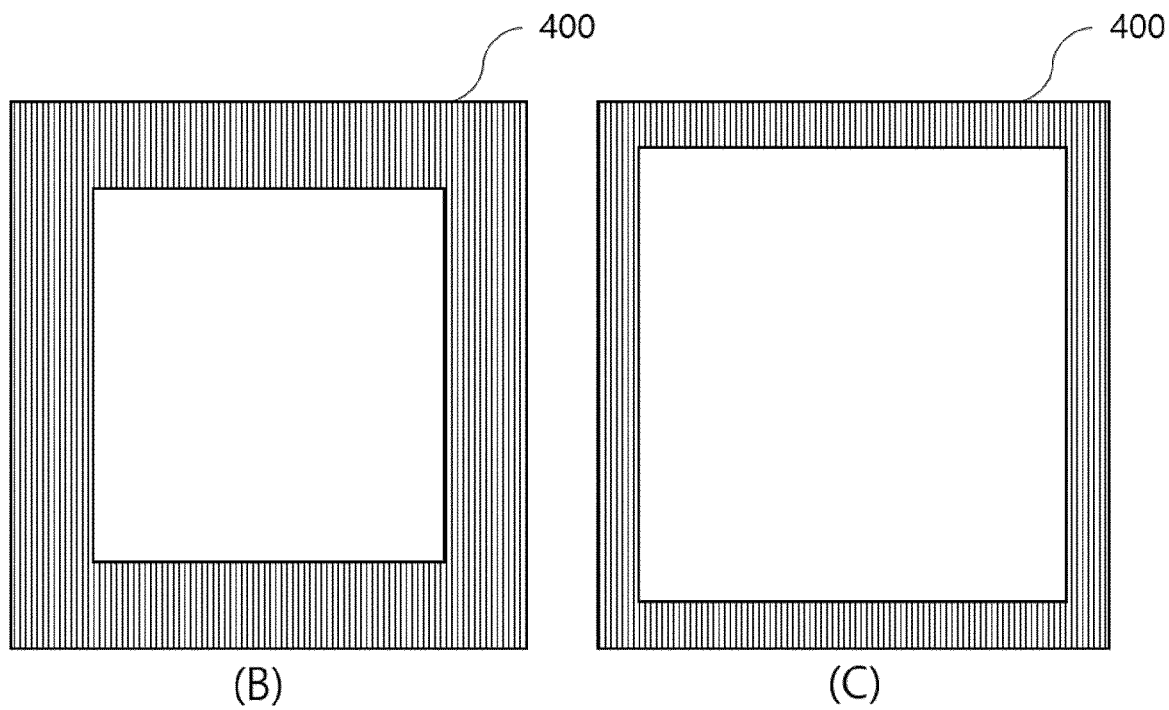
(B)          (C)

FIG. 8
(B)
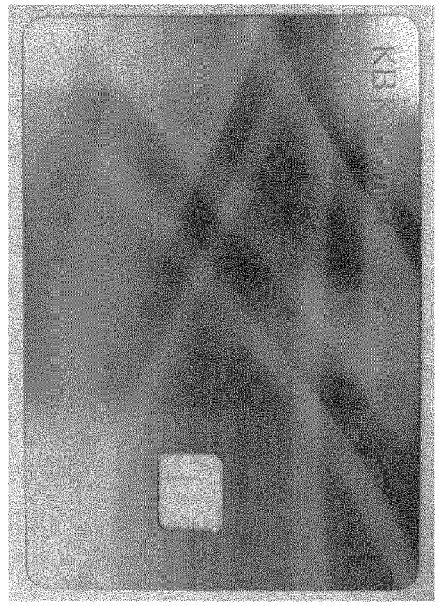
(D)
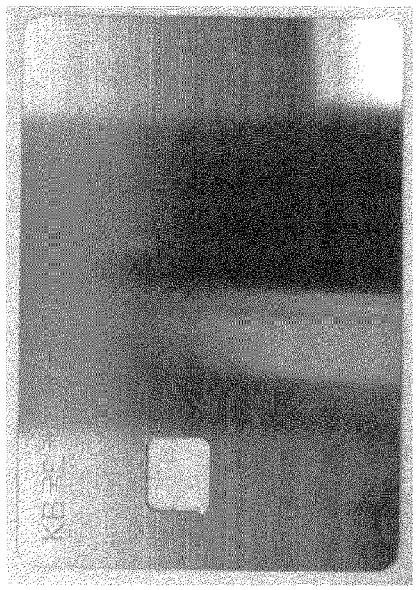
(A)
(C)

CARD WITH 3D PATTERN AND MANUFACTURING METHOD THEREOF

CROSS-REFERENCE TO RELATED APPLICATIONS

This application is a National Phase Entry application of PCT Application No. PCT/KR2022/018837, filed on Nov. 25, 2022, which claims priority to Korean Patent Application No. 10-2022-0135506, filed on Oct. 20, 2022, in Korean Intellectual Property Office, the entire contents of which are hereby incorporated by reference in its entirety.

TECHNICAL FIELD

The present disclosure relates to a metal card and a manufacturing method thereof. More specifically, the present invention relates to a card on which a 3D pattern is formed and a manufacturing method thereof.

BACKGROUND ART

In general, credit cards can be used instead of cash, and in recent years, smart cards with built-in IC chips capable of storing large amounts of information have been developed and are actively used not only for payment but also for various membership cards. In this smart card market, special cards using various materials are being developed. In particular, for VIP customers, differentiated metal credit cards are being developed in a variety of ways.

However, metal cards using metal may cause abnormal operation of antennas during non-contact communication with readers due to the nature of the metal, which may cause limitations in RF functions, the use of ATMs, or the like. In addition, it was difficult to form patterns and letters on the surface of such a metal card in the method of using a thin metal sheet or coating metal powder thinly. Furthermore, there was also a problem that when the metal card is formed of a material that is too light, the weight of the metal cannot be felt. Therefore, there is a demand for the development of a metal card which can overcome the limitations of the metal cards and express the weight and aesthetics unique to metal.

In particular, when a three-dimensional stereo effect or a 3D pattern exemplified by a pattern such as a hologram is given to such a metal card, various problems are revealed in products and processes, and solutions to these problems are urgently required.

In particular, there is a problem in that when processing the 3D pattern by a UV pattern printing method, it is not easy to attach or adhesively bond the 3D pattern to a metal body. A UV pattern is formed by coating and printing paint and then irradiating the paint with a predetermined amount of light, wherein due to fine differences, a three-dimensional effect and a 3D print pattern can be obtained. However, due to the unique surface smoothness of a metal material, there is a disadvantage that peeling between the metal body and the 3D pattern print layer easily occurs.

Furthermore, when performing the UV pattern printing process on such a metal body, a lot of metal debris is generated in the process and it is difficult to treat the debris. In addition, the metal card also has problems to be solved, such as the deterioration of the overall metal feeling due to the occurrence of a warpage caused by the UV 3D pattern printing and the inaccuracy of sheet matching due to the UV pattern printing.

DETAILED DESCRIPTION OF THE INVENTION

Technical Problem

The present disclosure was made to solve the above problems, and aims to provide a card manufacturing method capable of manufacturing a 3D pattern metal card and the card, in which in providing a 3D pattern, exemplified by a three-dimensional effect or a pattern such as a hologram, to a metal card, various problems such as the peeling problems revealed in products and processes, the metal debris problems, metal feeling deterioration problems, and sheet matching problems can be solved, thereby maximizing adhesiveness while minimizing the deterioration of metal feeling and product errors, and thus efficiently manufacturing a 3D pattern metal card with high completion efficiency at low cost.

Problem Solving Means

According to an embodiment of the present disclosure, in a method for solving the above problems, a method of manufacturing a metal card using a metal card manufacturing device, includes the steps of: forming an adhesive layer on a body plate made of a metal material having a preset first surface roughness; performing a vacuum deposition process using a first metal base on the adhesive layer; and print-processing a 3D pattern layer by using UV on a surface of the adhesive layer on which the vacuum deposition process was performed.

In addition, according to an embodiment of the present disclosure in order to solve the above problems, a metal card includes: an adhesive layer formed on a body plate made of a metal material having a preset first surface roughness; a vacuum deposition layer formed on the adhesive layer by a vacuum deposition process using a first metal base; and a 3D pattern layer formed by print-processing a 3D pattern layer by using UV on a surface of the adhesive layer where the vacuum deposition process was performed.

Effect of the Invention

According to an embodiment of the present disclosure, there can be provided a metal card with a 3D pattern and a manufacturing method thereof, in which an adhesive layer is formed on a body plate made of a metal material having a preset first surface roughness, a vacuum deposition process is performed using a first metal base on the adhesive layer, and a 3D pattern layer is print-processed using UV on a surface of the adhesive layer on which the vacuum deposition process was performed, thereby optimizing efficiency in the step of forming an adhesive layer suitable for the surface roughness of the metal body and the deposition process, which minimizes peeling problems on products and processes, while maximizing the metallic feel and appearance of the 3D pattern.

In addition, according to an embodiment of the present disclosure, it is possible to implement double 3D pattern printing by performing first UV pattern printing and second UV pattern printing on the metal deposition layer formed by the deposition process. In addition, it is also possible to prevent metal debris that may be generated due to the double 3D pattern printing, by processing the digital printing layer between the first and second UV pattern printing. Therefore, the problems of foreign substances and process defects that may occur in the manufacturing process can be minimized.

Furthermore, according to an embodiment of the present disclosure, there can be provided a metal card with a 3D pattern formed with high efficiency at low cost by minimizing errors in the manufacturing process by providing a matching hole capable of adjusting matching deviations that may be caused by metal, metal deposition and UV pattern printing.

BRIEF DESCRIPTION OF THE DRAWINGS

FIG. 4 and FIG. 5 show exemplary tables for explaining optimization table configurations according to an embodiment of the present disclosure.

FIG. 6 and FIG. 7 show exemplary views for explaining a digital printing structure and its effect according to an embodiment of the present disclosure.

FIG. 8 shows exemplary views showing various metallic feeling effects according to UV pattern printing based on a metal deposition process and a combination thereof according to an embodiment of the present disclosure.

MODE FOR CARRYING OUT THE INVENTION

The following merely illustrates the principles of the present disclosure. Therefore, those skilled in the art may implement the principles of the present disclosure and derive various devices that fall within the concept and scope of the present disclosure, even though they are not explicitly described or illustrated herein. In addition, it should be understood that all conditional terms and embodiments listed herein are, in principle, clearly intended only for the purpose of making the concept of the present disclosure understood and the concept of the present disclosure is not limited to these specifically listed embodiments and states.

For example, throughout the specification, when a part is said to be "connected" to another part, this includes not only the case of being "directly connected" but also the case of being "indirectly connected" with another member interposed therebetween. In addition, when a part "includes" a certain component, it means that it may further include other components instead of excluding other components, unless otherwise stated.

In addition, it should be understood that all detailed descriptions reciting specific embodiments as well as principles, aspects and embodiments of the present disclosure are intended to encompass structural and functional equivalents of such matters. Furthermore, it should be understood that such equivalents include not only currently known equivalents but also equivalents to be developed in the future, that is, all devices derived to perform the same function regardless of structure.

The above described objects, features, and advantages will become more apparent through the following detailed description in relation to the accompanying drawings, and accordingly, those skilled in the art to which the present disclosure belongs may readily implement the technical idea of the present disclosure. In addition, in describing the present disclosure, if it is determined that a detailed description of a known technology related to the present disclosure may unnecessarily obscure the gist of the present disclosure, the detailed description will be omitted.

Figure 1:
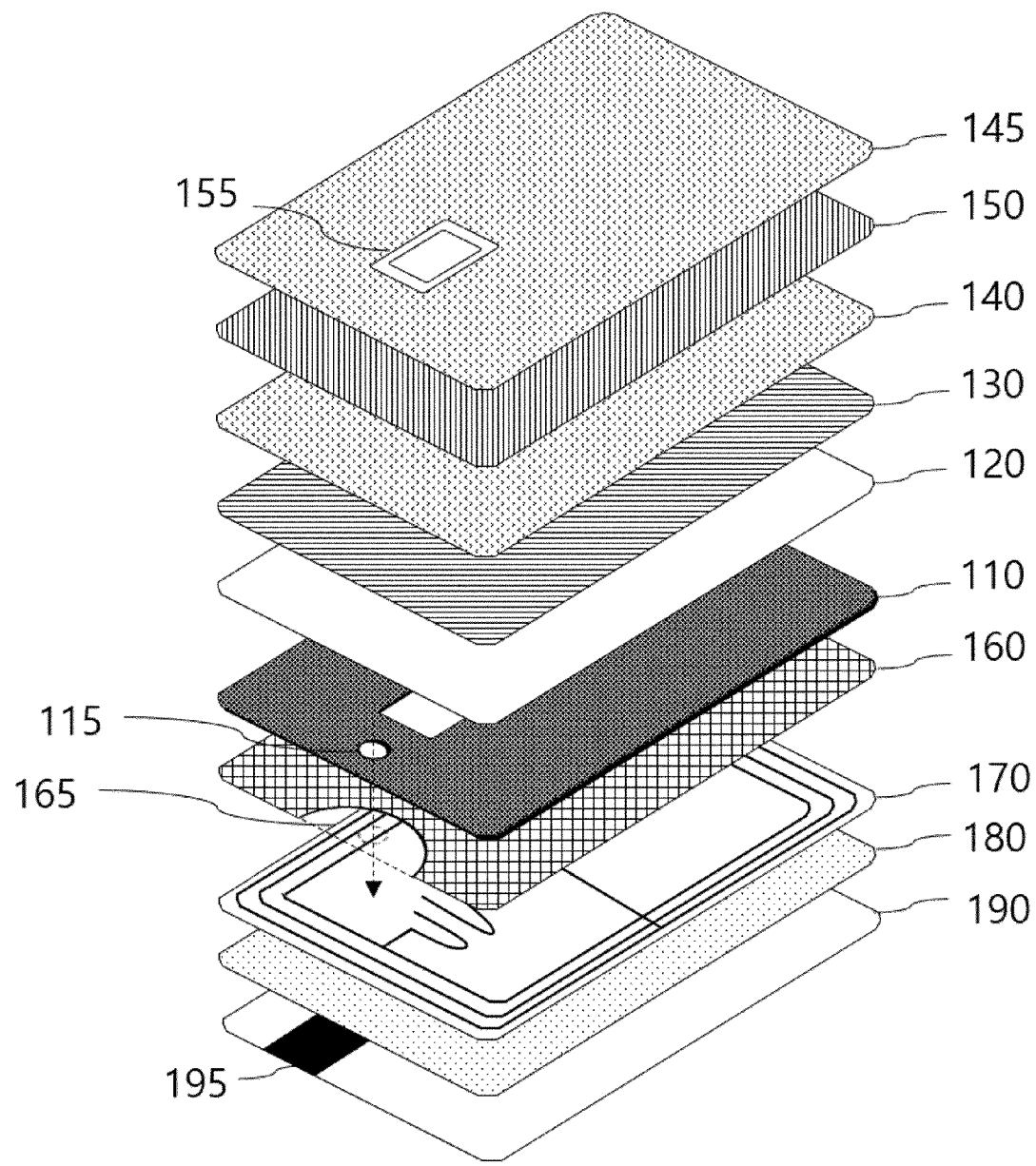
FIG. 1 is a perspective view of a metal card on which a 3D pattern is formed according to an embodiment of the present disclosure.
Figure 2:
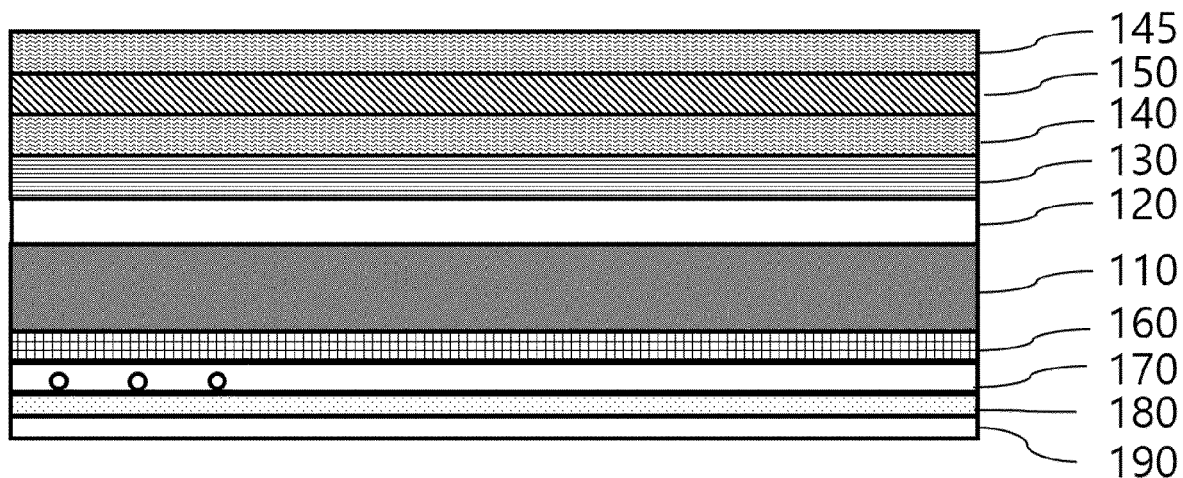
FIG. 2 is a cross-sectional view of a metal card on which a 3D pattern is formed according to an embodiment of the present disclosure.
Figure 3:
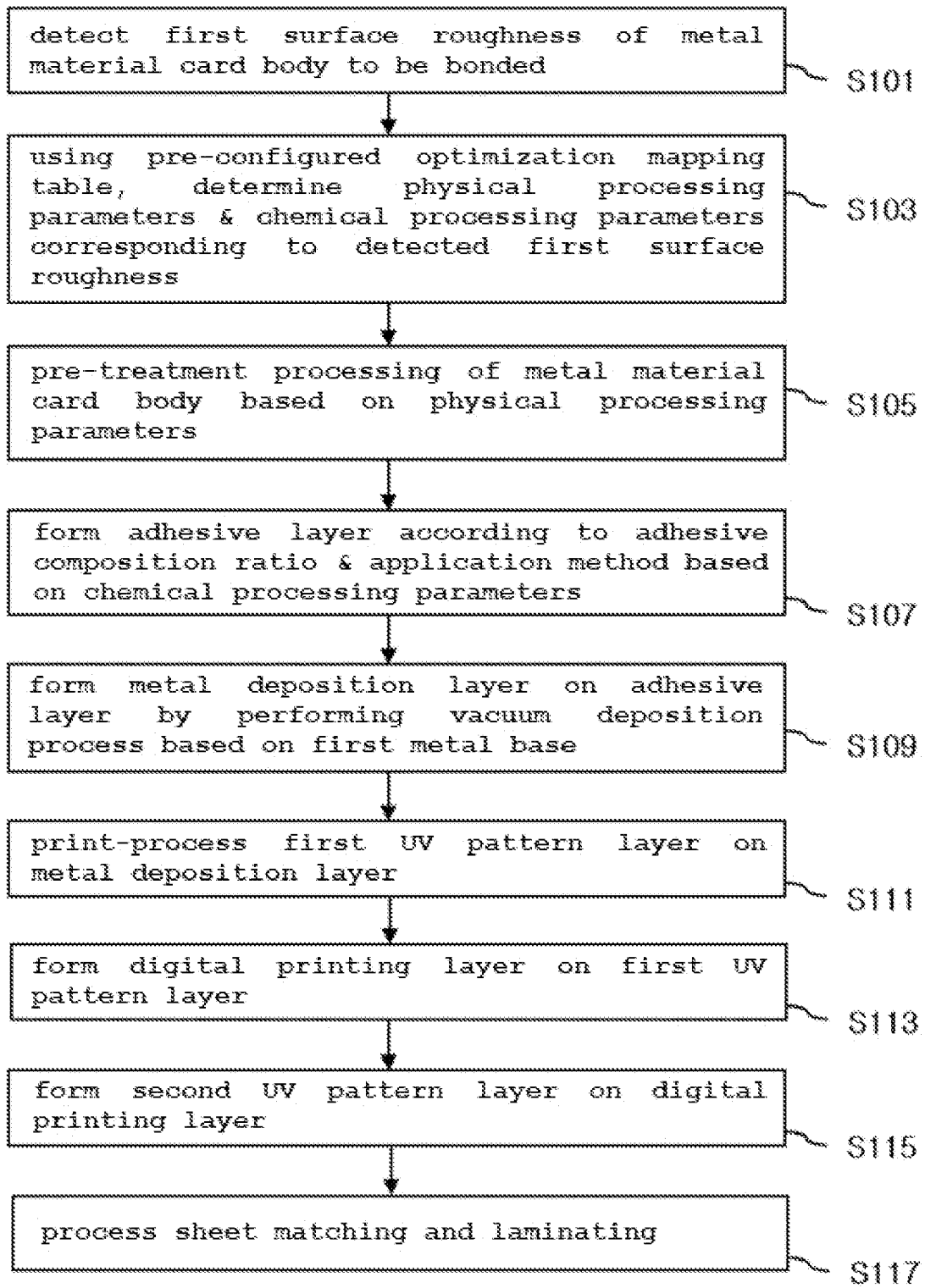
FIG. 3 is a flowchart for explaining a method of manufacturing a metal card on which a 3D pattern is formed according to an embodiment of the present disclosure.

FIG. 1 shows a perspective view of a metal card 100 according to an embodiment of the present disclosure, and FIG. 2 shows a cross-sectional view of the metal card 100 according to an embodiment of the present disclosure.

First, the metal card 100 may include one or more sheets or layers.

In addition, as an embodiment, the metal card 100 may be a card, which includes a contact IC chip module and a wireless communication chip module capable of wireless communication and can process, depending on card issuance and operation systems of card companies, process contact IC chip-based credit payment, check card payment, or wireless communication chip-based credit payment, check card payment, deferred payment, or the like, respectively.

In addition, according to an embodiment of the present disclosure described below, the metal card 100 is illustrated as a card in which a body of a single metal material is formed as a core sheet. However, a metal composition of special metal materials having various surface roughness may be different, and a metal core sheet that forms a metal body may be formed by mixing metal materials different from each other, mixing metal powder with other core materials such as PVC, stacking metal material layers different from each other, or using a clad metal material formed by combining two or more metal material layers in a layered structure.

Referring to FIG. 1, the metal card 100 according to an embodiment of the present disclosure may include a metal layer 110, an adhesive layer 120, a metal deposition layer 130, a first UV pattern layer 140, a digital printing layer 150, a second UV pattern layer 145, an insulating layer 160, an antenna inlay layer 170, an epoxy layer 180, a lower print layer 190 and a magnetic strip overlay MS O/L layer 195, and may be provided thereon with a contact IC chip 155 in the form of a chip-on-board COB, providing contact communication and transaction functions.

In this drawing, only the above-described components are indicated, but components are not limited thereto, other components for realizing a metal card may be further added, and a display unit, a bio-sensor unit, and the like may be additionally included for additional functions.

In addition, the metal card 100 of the present disclosure can be manufactured to satisfy standard size and thickness according to predefined standards, and may be implemented by combining each sheet by determining size and thickness of each sheet to an optimal thickness suitable for operation of the metal card and sensitivity of wireless communication thereof.

First, the metal layer 110 according to the embodiment of the present disclosure is a layer sheet for expressing a unique texture and weight of metal, and may be formed of steel use stainless SUS. Alternatively, it may be formed of solid metal such as copper, copper alloy and silver having antibacterial properties.

A metal material for constituting the metal layer 110 may be selected in consideration of not only texture and weight to express the characteristics of metal, but also durability, abrasion resistance, deterioration or the like to withstand mechanical processing. As an example, the metal layer 110 may be made of SUS that is resistant to corrosion and can be heat treated. Heat treatment refers to a manipulation process that heats a metal to a certain temperature so as to improve a certain target property or metal structure according to a cooling rate. The metal layer 110 may have irregularities on part or all of its surface for adhesion. In addition, the metal layer 110 may be processed through a heat treatment process to improve strength and resilience when manufacturing the card 100.

As an embodiment, the metal layer 110 of the present disclosure may be composed of a large-sized sheet including a plurality of cards, wherein a laminating process is carried out, in which several sheets are bonded together and heat and pressure are applied thereto so that a single sheet can be produced, and then a cutting process is carried out so that a plurality of cards can be produced. The cutting process of the metal sheet including the plurality of cards may be performed using a special processing material, a coolant, and a cutting tool according to the characteristics of the metal material.

The insulating layer 160 serves to block interference with respect to the metal layer 110 so that an antenna of the antenna inlay layer 170 can operate. In order to operate an NFC antenna, communication with an antenna reader at an opposite side must be performed. In this case, a magnetic field is generated from an antenna coil provided to the antenna inlay layer 170. At this time, due to a structure in which the antenna coil and a metal material of the metal layer 110 are in close proximity, the metal material changes self-resonant frequency SRF of the antenna coil, thereby exacerbating loss and lowering inductance of the antenna coil. Therefore, eventually communication failure occurs. This phenomenon is caused by eddy current generated in the metal due to the magnetic field. In order to eliminate this eddy current, it is necessary to position a material with high magnetic permeability and high resistance between the metal and the antenna so that lines of magnetic force can be adjusted in both directions, respectively. The insulating layer 160 is used for this purpose, and is also called a ferrite sheet. Ferrite can be used by pulverizing iron, oxidizing outer surface of the pulverized powder to insulate the outer surface, and shaping it by applying pressure. The metal layer 110 and the insulating layer 160 may be bonded using hot melt. Hot melt can be used as a film-type hot melt adhesive through its characteristic of being melted by heating and then solidified by cooling.

The antenna inlay layer 170 may be a sheet including a radio frequency RF antenna coil 121, and the antenna coil has a number of turns of coil that can be determined to exhibit optimized sensitivity through RF communications, for example, NFC and RFID sensitivity testing. In addition, the antenna coil of the present disclosure may be implemented to be directly connected to a COB contact area that is provided on a lower surface of the IC chip 155 of the chip-on-board COB attached through a separate accommodation groove. To this end, the metal layer 110 and the insulating layer 160 may be provided with accommodation grooves opened corresponding to the lower surface of the IC chip 155.

In addition, under the antenna inlay layer 170, the epoxy layer 180 and the lower print layer 190 and the magnetic strip overlay layer 195 may be sequentially provided. The epoxy layer 180 may provide a body support and buffering effect of an epoxy material, and information of the card to be printed on a rear side may be printed and displayed on the lower printing layer 190, or an image such as a separate pattern or shape may be printed on the lower printing layer 190. The magnetic strip overlay layer 195 may be composed of a sheet including a strip having magnetic information.

Meanwhile, in order to efficiently implement a 3D pattern effect based on UV printing according to an embodiment of the present disclosure, the adhesive layer 120, the metal deposition layer 130, the first UV pattern layer 140, the digital printing layer 150, and the second UV pattern layer 145 may be sequentially formed on top of the metal layer 110.

In particular, according to an embodiment of the present disclosure, in order to form the adhesive layer 120 on the metal layer 110, physical processing parameters and chemical processing parameters may be considered in advance. These physical processing parameters and chemical processing parameters may be determined according to tables pre-stored in a memory of a manufacturing device.

More specifically, as the physical processing parameters, physical pre-treatment processing parameters set to correspond to a surface roughness of the metal layer 110 may be exemplified. For example, according to preset physical processing parameters corresponding to first surface roughness of the metal layer 110, a card manufacturing device can perform various physical pre-treatment processes, such as sanding intensity, sanding frequency, brushing intensity, and brushing frequency.

In addition, as the chemical processing parameters, chemical pre-treatment processing parameters set to correspond to the surface roughness of the metal layer 110 may be exemplified. For example, the card manufacturing device may set a composition ratio of an adhesive corresponding to the adhesive layer 120, type of adhesive, adhesive application method, adhesive application strength, number of times the adhesive is applied, drying time or the like to optimized values according to the surface roughness. In addition, the chemical processing parameters may further include chemical etching pre-treatment processing parameters corresponding to the metal layer 110.

Herein, the type of adhesive may include various adhesives that provide adhesive strength in combination with a primer, and various adhesives such as acrylic adhesive, polyamide, polyamide amine curing agent, epoxy adhesive, acrylic rubber-metal composite, metal staple adhesive, etc. may be included. A composition may preferably include 50 to 60 wt % of water, 1.5 wt % of 1-ethylpyrrolidin-2-one, 0.9 to 1 wt % of triethylamine, and 38 to 42 wt % of polyurethane resin, wherein within these ranges of wt %, composition, application method, and application parameters according to chemical processing parameters may be determined.

Herein, the physical processing parameters and chemical processing parameters may be optimized to minimize the problems of process defects and peeling due to tensile force and appearance defect rates, which may vary depending on physical properties and types of metal materials of each metal layer 110. To this end, in a card manufacturing device according to an embodiment of the present disclosure, a surface roughness value according to type of a metal material of each metal layer 110 and physical processing parameters and chemical processing parameters mapped to the surface roughness value can be set to optimized values.

These physical processing parameters and chemical processing parameters may be determined to optimum values for minimizing an appearance defect rate while maximizing tensile force due to bonding structure of the adhesive layer 120, the metal deposition layer 130, the first UV pattern layer 140, the digital printing layer 150 and the second UV pattern layer 145. To this end, a preliminary test may be performed in advance and stored in the memory of the card manufacturing device in the form of a data table in advance.

In addition, values of such physical processing parameters and chemical processing parameters determined in advance according to the tables may be transferred from an external device to the card manufacturing device so as to be set.

According to the physical processing parameters and chemical processing parameters optimized as described above, the metal layer 110 may be formed as a body plate composed of an optimized metal material on which physical and chemical pre-treatment corresponding to the first surface roughness is performed.

In addition, the adhesive layer 120 may be formed in an optimized structure by determining its composition and application method according to the chemical processing parameters corresponding to the first surface roughness of the metal layer 110.

Meanwhile, the metal deposition layer 130 may be formed on the adhesive layer 120 according to a vacuum deposition process using a first metal base. The metal deposition layer 130 may increase tensile strength with respect to the first UV pattern layer 140, and thus serve to prevent separation in advance.

In addition, the metal deposition layer 130 is formed by a separate first metal base and thus can impart a metallic feeling different from that of the metal layer 110, thereby performing a function of exhibiting more aesthetic sensibility.

Furthermore, the first UV pattern layer 140 includes a 3D pattern layer formed on the metal deposition layer 130 by a UV printing method. Herein, the UV pattern printing method can employ a UV coating method, in which such a 3D pattern layer is formed by applying well-known UV paint and irradiating a certain amount of UV light from a UV light source to the applied UV paint so as to cure the UV paint. Since the first UV pattern layer 140 is formed on the metal deposition layer 130 formed on the adhesive layer 120, possibility of peeling can be minimized by optimizing the physical processing parameters and chemical processing parameters as described above.

Furthermore, the metal card 100 according to an embodiment of the present disclosure may further include the second UV pattern layer 145, thereby maximizing the effect of 3D pattern. However, when UV pattern layers are formed in double on the metal deposition layer 130, a product manufacturing defect rate due to the metal debris described above may increase.

Therefore, the metal card 100 according to an embodiment of the present disclosure may be configured such that the digital printing layer 150 is provided between the first UV pattern layer 140 and the second UV pattern layer 145. Herein, the digital printing layer 150 may be formed by a method of directly printing a preset digital image with a digital printing device and have a printing layer of a preset image, wherein the digital printing layer 150 may also serve to suppress metal debris that may be generated while processing the second UV pattern layer 145 after processing the first UV pattern layer 140.

In addition, the digital printing layer 150 may be formed only on a specific side edge area of the first UV pattern layer 140 in order to maximize the effect of preventing metal debris while reducing manufacturing cost.

Meanwhile, the second UV pattern layer 145 may be formed in a pattern capable of further emphasizing the stereoscopic 3D effect imparted by the first UV pattern layer 140 or providing new stereoscopic 3D effect, and may be printed on the digital printing layer 150 in a state in which metal debris is minimized.

Furthermore, since the metal deposition layer 130, the first UV pattern layer 140, the digital printing layer 150 and the second UV pattern layer 145 as mentioned above have own three-dimensional effect, metallic feeling, image printing effect or the like, the metal card 100 according to the embodiment of the present disclosure can maximize rich and diverse three-dimensional effects and metallic feeling according to combination of designs, patterns, shapes, and images of each of the metal deposition layer 130, the first UV pattern layer 140, the digital printing layer 150 and the second UV pattern layer 145.

In addition, the metal card 100 as described above may be formed by combining the metal layer 110 serving as a core body with the remaining components by operating one or more automated card manufacturing devices that process print-process, computerized numerical control CNC machining, laminating, etc. according to each process.

To this end, a card manufacturing device according to an embodiment of the present disclosure may include, even though not separately shown, a parameter setting unit for setting processes and parameters for each process, a control unit for controlling a process according to the set parameters and one or more hardware modules for physically processing each print-process, adhesion processing, CNC processing, matching processing, laminating processing, etc. according to operation of the control unit.

By operating the card manufacturing device according to the embodiment of the present disclosure as describe above, the metal layer 110, the adhesive layer 120, the metal deposition layer 130, the first UV pattern layer 140, the digital printing layer 150, the second UV pattern layer 145, the insulating layer 160, the antenna inlay layer 170, the epoxy layer 180, the lower print layer 190 and the MS O/L layer 195 may be sequentially formed according to the preset processes.

In addition, all of the above components may be matched and laminated at once, or may be processed to form a single card body by forming a primary assembly through a primary processing of a 3D pattern structure including the metal layer 110, the adhesive layer 120, the metal deposition layer 130, the first UV pattern layer 140, the digital printing layer 150 and the second UV pattern layer 145, and then matching and stacking all remaining sheets, and carrying out secondary laminating.

In particular, in sheet matching, one or more matching holes 115 may be processed in the metal layer 110 according to the embodiment of the present disclosure. The insulating layer 160 may have a semicircular opening part 165 corresponding to the matching hole 115. The matching hole 115 and the semicircular opening 165 may represent a preset matching reference position.

Accordingly, the card manufacturing device can detect positional information of each of the matching hole 115 and the semicircular opening 165 by means of a visual sensor, thereby quickly and accurately matching the remaining sheets. This is faster and more accurate than the existing simple alignment methods that adjust the entire edge range of a card for overall matching of separate sheets with light transmission recognition. In particular, an alignment error or mistake due to the impermeability of light through the metal layer 110 or the insulating layer 160 may be prevented in advance.

That is, in the metal layer 110, a light source for visual recognition and matching can be transmitted through the matching hole 115 and the insulating layer 160 also transmits light through the opening area, so that alignment of the antenna inlay layer 170, the epoxy layer 180 and the lower print layer 190 positioned at a lower portion can be processed quickly and easily.

In the metal card 100 formed as described above, it is preferable that the entire 3D pattern layer combining the metal deposition layer 130, the first UV pattern layer 140, the digital printing layer 150 and the second UV pattern layer 145 at the upper portion is formed to be about 0.01 mm. In addition it is preferable that the metal layer 110 is about 0.35 mm, the insulating layer 160 is about 0.06 mm, the antenna inlay layer 170 is about 0.13 mm, the epoxy layer 180 is about 0.1 mm, the lower print layer 190 is about 0.1 mm, and the magnetic layer is about 0.04 mm.

FIG. 4 is a flowchart for explaining a card manufacturing method of a card manufacturing device according to an embodiment of the present disclosure.

First, a card manufacturing device detects a first surface roughness of a metal material card body to be bonded (S101).

Subsequently, physical processing parameters and chemical processing parameters corresponding to the detected first surface roughness are determined using a pre-configured optimization mapping table (S103).

Then, pre-treatment processing of the metal material card body plate is performed based on the physical processing parameters (S105). Herein, the metal material body plate processed for pre-treatment may constitute a metal layer 110 of a metal card 100.

Then, an adhesive layer is formed on the metal layer 110 according to an adhesive composition ratio and an application method based on the chemical processing parameters (S107).

In addition, a metal deposition layer is formed on the adhesive layer 120 by performing vacuum deposition process based on a first metal base (S109).

After that, a first UV pattern layer 140 is print-processed on the metal deposition layer 130 (S111), a digital printing layer 150 is formed on the first UV pattern layer 140 (S113), and a second UV pattern layer 145 is formed on the digital printing layer 150 (S115).

Herein, the metal deposition layer may be formed differently depending on the metal base. In particular, the metal deposition layer may be formed of a material capable of imparting a mirror effect to the metal layer 110, so that a mirror deposition effect may be further imparted. In this case, the metal deposition layer 130 may be formed as a mirror deposition layer so as to further enhance metallic feeling.

Furthermore, even if surface of the first UV pattern layer 140 formed on the mirror deposition layer is rough, smooth metallic feeling can be re-imparted according to the formation of the digital printing layer 150 and the second UV pattern layer 145. Therefore, it is possible to form a smooth outer surface and minimize appearance deformation, while imparting elegant effects according to various combinations of the metal deposition layer 130, the first UV pattern layer 140, the digital printing layer 150 and the second UV pattern layer 145.

Then, the manufacturing of the metal card 100 may be completed by performing sheet matching and laminating processing through the matching hole 115 and the semicircular opening part 165 (S117).

FIG. 4 and FIG. 5 show exemplary tables for explaining optimization table configurations according to an embodiment of the present disclosure.

Referring to FIG. 4 and FIG. 5, optimization tables of physical processing parameters and chemical processing parameters according to an embodiment of the present disclosure may be configured according to optimization test results for each parameter.

As described above, physical processing parameters may be determined according to the first surface roughness of the metal body plate, which constitutes the metal layer 110, before forming the adhesive layer 120, and used in the physical pre-treatment of the body plate.

Also, chemical processing parameters may be determined according to the first surface roughness before forming the adhesive layer 120, and used to determine the composition or the coating method of the adhesive layer.

In the parameter determination as described above, in order to optimize tensile strength, the card manufacturing device may use a tensile force vs surface roughness test result table for each metal material pre-stored in a memory so as to determine physical processing parameters or chemical processing parameters corresponding to the first surface roughness of the metal material, thereby maximizing tensile strength.

In addition, in order to minimize appearance defects, the card manufacturing device may use an appearance vs surface roughness test result table for each metal material pre-stored in the memory so as to determine physical processing parameters or chemical processing parameters corresponding to the first surface roughness of the metal material, thereby minimizing appearance defects.

In other words, FIG. 4 and FIG. 5 show examples of a tensile force vs surface roughness test result table for each metal material and an appearance vs surface roughness test result table for each metal material, and physical processing parameters and chemical processing parameters optimized for each surface roughness may be determined by tables configured according to each test result.

For example, according to the roughness of a metal material, sanding frequency, sanding intensity, brushing frequency, brushing intensity, etc. as physical processing parameters may be determined to values that maximize tensile strength while minimizing appearance defects. In addition, as chemical processing parameters, application method, silk screen density (mesh density), application frequency, drying time, etc. may be determined to values that maximize tensile strength while minimizing appearance defects.

FIG. 6 and FIG. 7 show exemplary views for explaining a digital printing structure and its effect according to an embodiment of the present disclosure.

First, referring to FIG. 6, FIG. 6 shows pictures of the results of a test conducted by the present applicant according to his own process test, wherein FIG. 6A indicates that, when a digital printing layer 150 is not provided, a lot of metal debris are generated by UV printing on a metal deposition layer is generated.

However, as shown in FIG. 6B, in the case of printing the second UV pattern layer 145 after printing the digital printing layer 150 on the first UV pattern layer 140 according to the embodiment of the present disclosure, it is possible to manufacture a sheet in a smooth form without metal debris or foreign matter, which indicates that manufacturing defects can be minimized.

Furthermore, as shown in FIG. 7, the digital printing layer 150 may be used only as a means for minimizing the generation of metal debris, which is generated mainly at the edge of the card body. In this case, in order to reduce printing cost, the digital printing layer 150 may be formed to cover only a preset side edge area on the first UV pattern.

As shown in FIG. 7A, such a side edge area may be formed in a rectangular frame shape that has a certain width and surrounds only an edge area corresponding to the body plate of the metal layer 110.

Furthermore, as shown in FIG. 7B and FIG. 7C, in the case of manufacturing a plurality of metal cards 100 in a state in which large sheets 400 forming each layer are laminated, since metal debris is mainly generated only on edges of the large sheets 400, side edge areas may be formed in a rectangular frame shape surrounding only edge areas of the large sheets 400.

FIG. 8 shows exemplary views showing various metallic feeling effects according to UV pattern printing based on a metal deposition process and combination thereof according to an embodiment of the present disclosure.

Referring to FIG. 8, it is possible to impart elegant feeling effect according to combination of the metal deposition layer 130, the first UV pattern layer 140, the digital printing layer 150 and the second UV pattern layer 145 according to an embodiment of the present disclosure, and it is possible to implement a variety of combination configurations in which an outer surface is smooth and appearance deformation can be minimized.

More specifically, for example, FIG. 8A shows a pattern shape that can be used for enhancing the metallic feel, and FIG. 8B shows a three-dimensional pattern that can be used as a holographic object pattern shape for enhancing three-dimensional effect.

Accordingly, through combination of the metallic feeling of the pattern of FIG. 8A imparted to the metal layer 110, the metal deposition layer 130 and the first UV pattern layer 140, map shape images of the digital printing layer 150, in which map parts are processed to be transparent, and holographic object pattern images of FIG. 8B imparted three-dimensionally to the second UV pattern layer 145, it is possible to manufacture a metal card 100 capable of emphasizing metallic feeling of the map shape and creating three-dimensional effect, as shown in FIG. 8C.

Furthermore, by imparting three-dimensional effect by the patterns of FIG. 8B formed on the metal layer 110, the metal deposition layer 130 and the first UV pattern layer 140, and forming the metallic feeling pattern of FIG. 8A on the second UV pattern layer 145 that is formed on the digital printing layer 150, it is possible to manufacture a metal card 100 capable of maximizing metallic feeling of a three-dimensional pattern itself, as shown in FIG. 8D.

Furthermore, as described above, when normally forming a UV pattern print layer on a metal surface, there is a problem in that the metallic feeling is reduced and roughness occurs due to the three-dimensional structure. However, according to the present disclosure, it is possible to implement mirror metallic feeling, etc. according to the combination of the metal deposition layer 130, the first UV pattern layer 140, the digital printing layer 150 and the second UV pattern layer 145, thereby achieving the manufacture of a metal card 100 with much more luxurious and smooth feeling.

Figure 9:
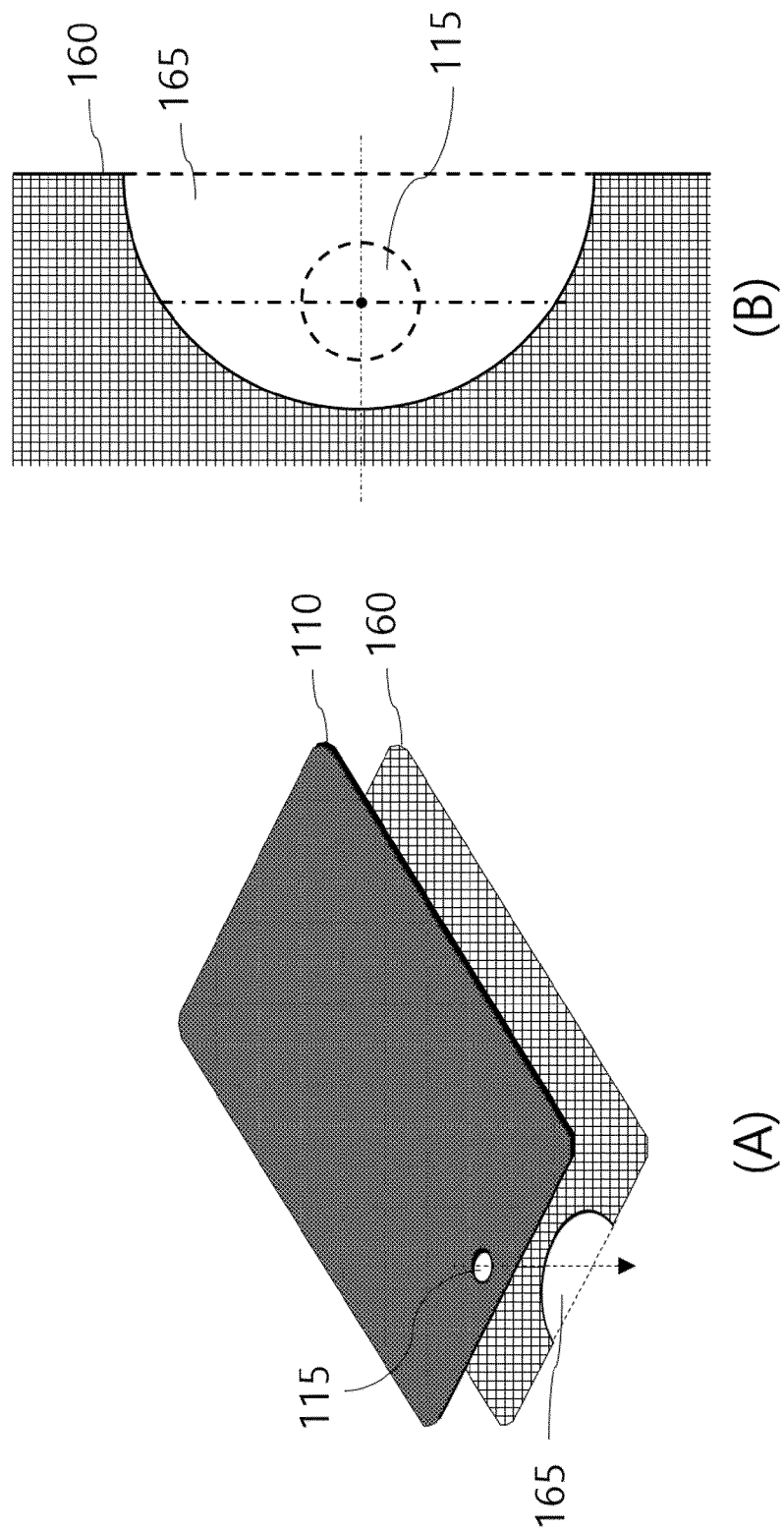
FIG. 9 shows exemplary diagrams for explaining a matching hole arrangement and a sheet matching method using the same according to an embodiment of the present disclosure.

FIG. 9 shows exemplary diagrams for explaining a matching hole arrangement and a sheet matching method using the same according to an embodiment of the present disclosure.

Referring to FIG. 9, for sheet matching, one or more matching holes 115 may be processed by a hole punching method in the metal layer 110 according to an embodiment of the present disclosure, and the semicircular opening part 165 corresponding to the matching hole 115 may be provided in the insulating layer 160. The matching hole 115 and the semicircular opening part 165 can indicate the preset matching reference position, wherein the semicircular shape of the opening part 165 is only an example and in addition to such a semicircular shape, the opening part 165 may be formed in any shape that is opened on the basis of the matching hole 115 as a reference position in order to identify the matching hole 115.

Furthermore, the card manufacturing device can detect positional information of each of the matching hole 115 and the semicircular opening 165 by means of a visual sensor, thereby quickly and accurately matching the remaining sheets. This is faster and more accurate than the existing simple alignment methods that adjust the entire edge range of a card for overall matching of separate sheets with light transmission recognition. In particular, an alignment error or mistake due to the impermeability of light through the metal layer 110 or the insulating layer 160 may be prevented in advance.

For example, the card manufacturing device can sequentially laminate the insulating layer 160 and the antenna inlay sheet 170 on the lower portion of the body plate on which the 3D pattern layer is printed. In addition, by using the positional information of the matching hole 115 transmitted through sensor light, the card manufacturing device may align and correct positions of the metal layer 110 of the body plate on which the 3D pattern layers 120, 130, 140, 150, 145 are printed, the insulating layer 160 and the antenna inlay sheet 170.

Accordingly, the opening part of the insulating layer 160 may be processed such that a predetermined area is opened around the matching hole 115 of the body plate of the metal layer 110 and the matching hole of the body plate is exposed in a downward direction of the insulating layer.

In addition, the card manufacturing device can perform matching by adjust stacking positions of each sheet such that the matching hole is positioned in the center of a certain open area of the insulating layer.

As described above, optimal embodiments have been disclosed in the drawings and specifications. Although specific terms are used herein, they are only used for the purpose of describing the present disclosure, and are not used to limit the meaning or scope of the present disclosure described in the claims. Therefore, those of ordinary skill in the art will understand that various modifications and equivalent other embodiments are possible therefrom. Therefore, the true technical scope of protection of the present disclosure should be determined by the technical spirit of the appended claims.

| Brief Explanation of Reference Numerals | |
| --- | --- |
| 100: metal card | 155: IC chip |
| 110: metal layer | 120: adhesive layer |
| 130: metal deposition layer metal layer | |
| 140: first UV pattern layer | |
| 150: digital printing layer | |
| 145: second UV pattern layer | |
| 160: insulating layer | |
| 170: antenna inlay layer | |
| 180: epoxy layer | |
| 190: lower print layer | |
| 195: magnetic strip overlay layer | |

What is claimed is:

1. A method of manufacturing a card by using a card manufacturing device, the method comprising:
    forming an adhesive layer on a body plate made of a metal material having a preset surface roughness;
    forming a metal deposition layer by performing a vacuum deposition process using a first metal base on the adhesive layer;
    forming a first UV pattern layer by printing a first UV pattern on the metal deposition layer using UV;
    forming a printing layer by printing a preset image on the first UV pattern layer; and
    forming a second UV pattern layer by printing a second UV pattern on the printing layer using UV, and
    wherein pattern shape of the first UV pattern is different from pattern shape of the second UV pattern.

2. The method of claim 1, further comprising:
    performing physical pre-processing of the body plate according to physical processing parameters determined in correspondence with a surface roughness of the body plate, prior to forming the adhesive layer.

3. The method of claim 1, further comprising:
    determining a composition or an application method of the adhesive layer according to chemical processing parameters determined in correspondence with a surface roughness of the body plate, prior to forming the adhesive layer.

4. The method of claim 1, wherein forming the printing layer includes forming a digital printing layer so as to cover a preset side edge area on the first UV pattern layer.

5. The method of claim 4, wherein the side edge area is an area formed in a rectangular frame shape having a predetermined width.

6. The method of claim 1, wherein the pattern shape of the first UV pattern includes a holographic object shape.

7. The method of claim 1, further comprising:
    forming a matching hole of a predetermined size at one side of the body plate.

* * * * *